Figure 1:
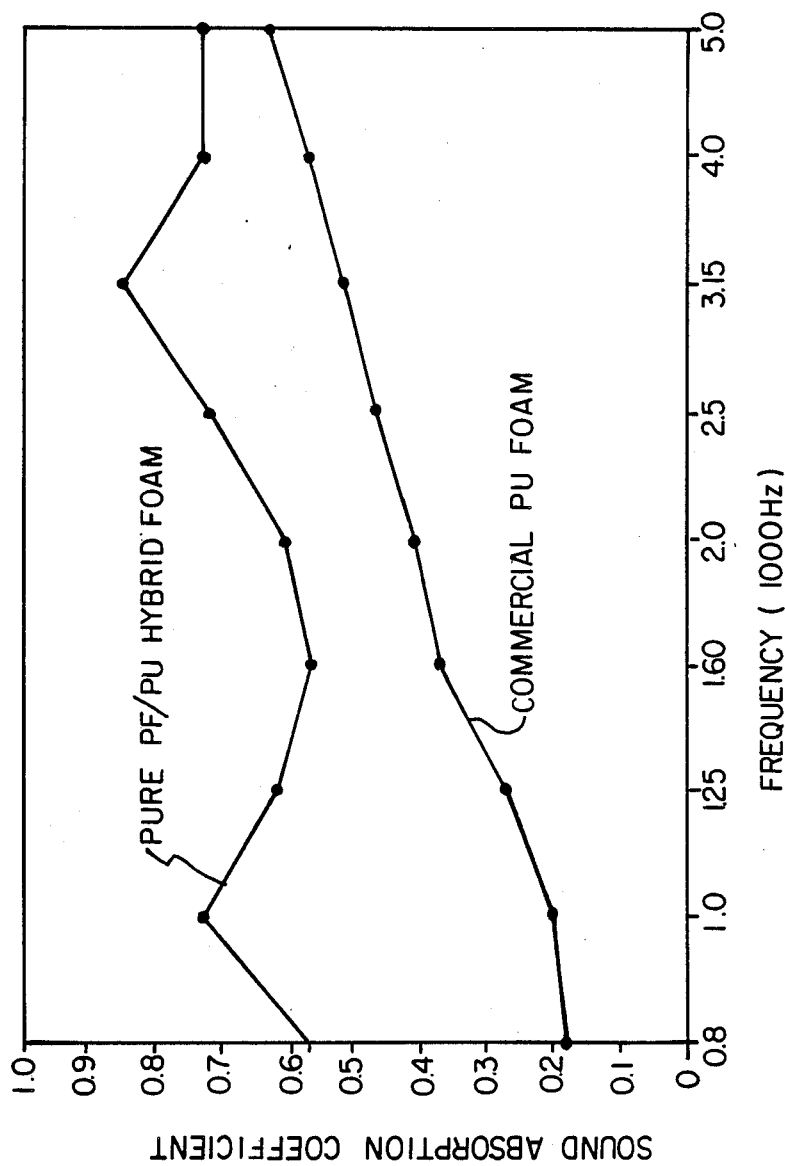
Figure 2:
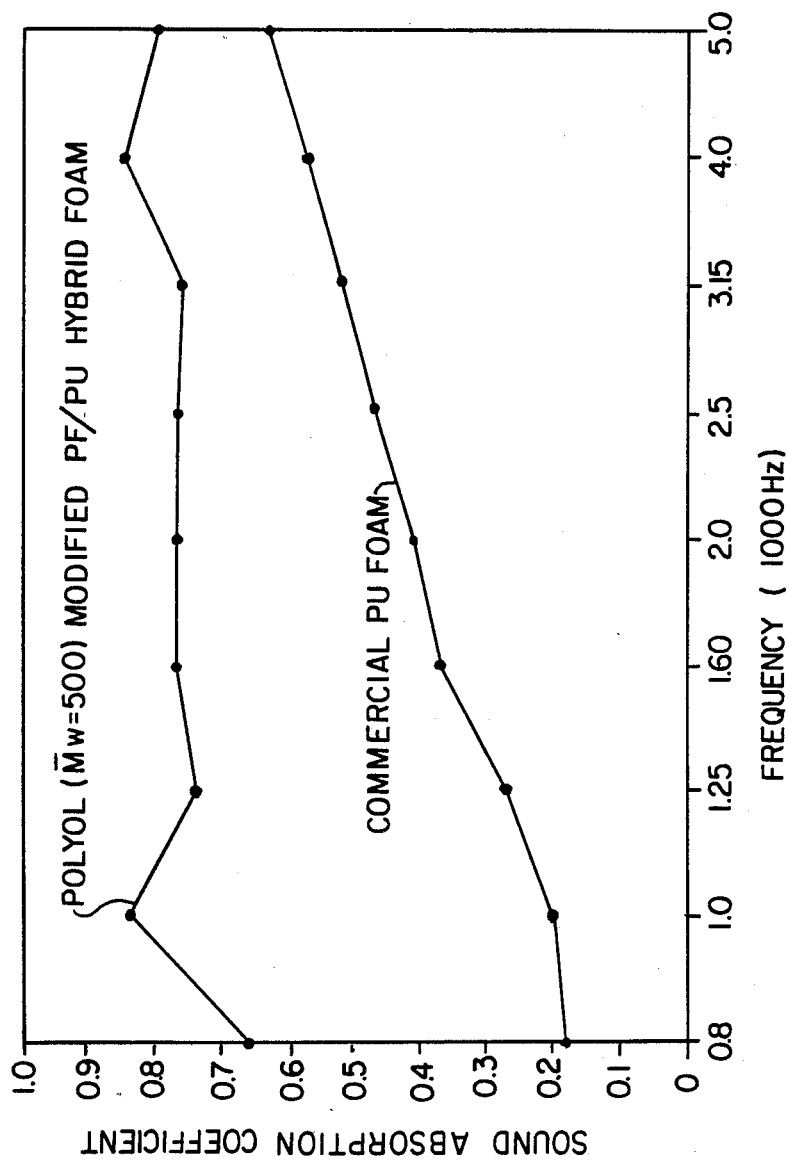

United States Patent [19]

Chen et al.

[11] Patent Number: 4,916,167

[45] Date of Patent: Apr. 10, 1990

[54] PRODUCTION OF HYBRID FOAM FOR SOUND ABSORPTION

[75] Inventors: Jui-Hsiang Chen; Shih-Jung Tsai; Shen-Nan Tong, all of Hsin-chu; Peter T. K. Wu, Taipei, all of Taiwan

[73] Assignee: Industrial Technology Research Institute, Taiwan

[21] Appl. No.: 250,896

[22] Filed: Sep. 29, 1988

[51] Int. Cl.$^4$ ............................................. C08G 18/14
[52] U.S. Cl. ..................................... 521/159; 521/170
[58] Field of Search .............................. 521/159, 170

[56] References Cited

U.S. PATENT DOCUMENTS 3,872,034 3/1975 Dickert .............................. 521/170

Primary Examiner—Maurice J. Welsh
Attorney, Agent, or Firm—Darby & Darby

[57] ABSTRACT

Production of a lightweight, flame retardant, sound absorption composition in the form of a phenol-aldehyde/polyurethane hybrid polymer foam of open cell structure and interconnected continuous porous architecture, by reacting 100 parts by weight phenolic resin, such as a resole resin of an aldehyde and a phenol, e.g. formaldehyde and phenol, having an aldehyde to phenol mole ratio greater than about 1:1; about 50–300 parts by weight aromatic or aliphatic polyisocyanate; about 0–100 parts by weight aliphatic group containing polyol, e.g. a polyether, polyester, polycaprolactone or polybutadiene polyol; and about 0–100 parts by weight filler; in the presence of a catalyst, e.g. a basic and/or metal salt catalyst in an amount of about 0.01–2 parts by weight, and a blowing agent, especially with all reactants but the polyisocyanate being premixed and then combined with the polyisocyanate for reaction in an open mold, e.g. with the resole resin having a pH of about 4.5–9.5, a solid content of about 50–98%, and a viscosity of not greater than about 100,000 cps at 25° C., and optionally with a surfactant being included in the premixed reactants.

22 Claims, 6 Drawing Sheets

PRODUCTION OF HYBRID FOAM FOR SOUND ABSORPTION

FIELD AND BACKGROUND OF THE INVENTION

The main purpose of noise reduction is to diminish the noise to an acceptable level which is comfortable rather than harmful to the human ear. Utilizing either sound insulation material or sound absorption material is the most popular means for reducing noise level. However, sound insulation material can only change the noise propagation path and produce a finite effect on noise reduction, whereas sound absorption material can absorb sound waves (i.e. noise) directly and thus produce a true noise reduction effect.

It is known in the prior art that polymer foams have sound absorption ability, and these have been used as sound absorption material for some time (D. Klempner, et al., J. Appl. Polym. Sci., vol. 32, pp. 4197–4208 (1986); Alex C. F. Chen, et al., J. Appl. Polym. Sci., vol. 20, pp. 3387–3423 (1976); and Robert S. Moore, Polymer Encyclopedia, vol. 12, pp. 700–725).

Normally, the sound absorption ability of polymer foams depends on two major factors. The first is the macroscopic physical state of the foam, such as cell morphology, porosity, thickness and density, and the second is the molecular structure of the polymer, such as chain flexibility and cross linking density. In principle, noise contacts the open-celled foam structure in the form of sound pressure waves, such that the sound energy of the incident sound wave within the porous structure is partially converted to heat energy due to the effect of air friction, and part of the sound energy is dissipated in the form of heat energy due to the molecular chain damping effect of the polymer.

Polyurethane foams are among the many kinds of foam materials which have been used as noise absorbers. However, because of their poor flame retardancy characteristics, polyurethane foams are generally not considered usable where human safety requirements are concerned.

Inorganic fibers, such as glass fiber or asbestos fiber, are non-flammable materials, and when fabricated into thick plate form can exhibit sound absorption ability to some degree. A disadvantage thereof is that since the specific gravity of both glass fiber and asbestos fiber is high, the resultant product is rather heavy, and is troublesome to install. A further disadvantage of asbestos fiber is that, being a potential carcinogen, it is considered a hazardous material.

DESCRIPTION OF THE INVENTION

This invention relates to a lightweight composition for sound absorption use, and a method for its production. The composition comprises a phenol-aldehyde/polyurethane (PA/PU) hybrid foam having sound absorption properties, especially a phenol-formaldehyde/polyurethane (PF/PU) hybrid foam, of open cell structure and interconnected continuous porous architecture. This hybrid foam not only possesses good sound absorption ability but also outstanding flame retardancy properties.

The hybrid polymer foam according to the invention is formed from 100 parts by weight phenolic resin; about 50–300, preferably 100–150, parts by weight polyisocyanate; about 0–100, preferably 5–30, parts by weight aliphatic group containing polyol; and about 0–100, preferably 10–30, parts by weight filler; said parts of polyisocyanate, polyol and filler being based on the 100 parts of phenolic resin.

The main molecular species of ingredients in the instant hybrid foam are aromatic ring containing compounds such as phenols, and also, where present, aromatic isocyanate compounds. This is because it has been found that, due to the high aromaticity of the resulting polymer chain structure, a facilitating char-formation characteristic is imparted to the hybrid foam for forming a carbonized protective surface layer. This carbonized surface layer acts to suppress the flame propagation tendency of the hybrid foam, such that it possesses superior flame retardancy properties.

Thus, due to the more aromatic character of the hybrid polymer of the instant foam, it possesses good heat resistance and enhanced flame retardancy properties.

The macroscopic cell morphology of the instant hybrid foam is open-celled and has a continuous pore structure or architecture, and this physical state contributes an outstanding sound absorption ability to the foam. By reason of the lightweight or low density nature of the hybrid foam, it possesses a large specific cell surface area, which serves to increase the air friction effect for promoting the sound absorption properties of the product.

It has also been found that as the thickness of the hybrid foam is increased, its sound absorption capacity likewise increases at the low and medium sound frequency regions (100–1500 Hz), although at the high frequency region (above 1500 Hz), the improving effect is less pronounced. Hence, for the instant open cell structure hybrid foam, the influence of the product thickness on sound absorption is unexpectly frequency dependent. Normally, in the case of polymer foams there is no simple functional relationship between thickness and sound absorption capacity or sound absorption coefficient (as defined below) in the full testing frequency range.

It has been further found that the sound absorption properties of the instant hybrid foam are improved significantly by including in the composition, even in minor quantities, an aliphatic polyol such as a polyether polyol.

Thus, by changing the chemical composition of the polymer molecular structure, a series of hybrid foams can be produced according to the invention with different polymer chain structures and cell morphology characteristics. The resultant foams in turn possess different acoustic attributes.

Specifically, while the dominating molecular species in the hybrid foam polymer composition are desirably aromatic compounds, so as to provide increased flame retardancy properties in the system, the resultant aromatic rings in the polymer chains are considered to impart a more rigid character to the polymer. On the other hand, by including aliphatic polyol components, such as aliphatic polyether polyols, in the composition, these are able to react with portions of the polyisocyanate components to form typical polyurethane polymer chain structures, which disperse thoroughly within the entirety of the phenol-aldehyde/polyurethane hybrid polymer matrix.

Such built-in polyol segments, especially polyether polyol segments, constitute soft segment or flexible chain structures which serve to increase the motion or flowability of the resultant polymer, whereby the polyol modified hybrid polymer exhibits more viscous behavior, the net effect being an increase in the degree of polymer chain flexibility.

Hence, when the incident sound waves contact and penetrate into the porous hybrid foam, portions of the sound energy will be dissipated in the form of heat due to the effect of air friction, and portions of the sound waves will cause a microscopic vibration or motion of the polymer chain, which will induce viscous friction between adjacent molecular chains, to produce a heat dissipation effect. Normally, such polymer chain viscous friction heat dissipation mechanism is explained as a damping effect of the polymer, and it is very sensitive to testing frequency and environmental temperature.

Accordingly, modification of the hybrid foam by adding an aliphatic group containing polyol component provides the so modified polymer with a more flexible polymer chain structure, which improves the sound absorption ability of the product.

The raw materials used to produce the instant hybrid foams are phenolic resins, especially resoles, and polyisocyanates, plus catalysts and blowing agents, and optionally polyols, fillers, surfactants and conventional additives.

The phenolic resin is a phenol-aldehyde (PA) resin, and may be any isocyanate-reactable polyhydroxy phenyl group and aliphatic group containing resin, such as a polyphenol-aliphatic group containing resin, a phenol-(mono or poly)hydroxy-aliphatic group containing resin, and the like, preferably a phenol-formaldehyde (PF) resin. The molar ratio of aliphatic groups to phenol groups of the polyhydroxy phenolic resin is greater than about 1:1, such as about 1.2–5:1, preferably about 1.2–3:1, in direct relation to the molar ratio of aldehyde to phenol components from which the resin is derived.

The phenolic resin is preferably in the form of a resole resin. Such resole resins are thermosetting resins which are synthesized from aldehydes and phenols via an addition and condensation reaction in alkaline solution, i.e. of pH >7, where the aldehyde/phenol mole ratio is greater than 1.0, such as about 1.2–5:1, preferably about 1.2–3:1.

Suitable aldehyde compounds include formaldehyde, acetaldehyde, propionaldehyde, n-butylaldehyde and furfural, formaldehyde being preferred. The corresponding phenolic compounds used in the resole formation include phenol, and substituted phenols which are substituted with one or more substituents such as alkyl, hydroxy, halo, cycloalkyl, and the like groups, and particularly o-, m- or p- cresol, p-tert.-butyl phenol, p-tert.-amyl phenol, 1,2-dimethyl-3-hydroxybenzene, 1,3-di-hydroxybenzene, p-chlorophenol, o-bromophenol, 2-bromo-4-cyclohexylphenol and 2-methyl-4-bromophenol. The preferred phenolic compound is phenol.

In preparing the resoles, base catalysts can be used to promote the reaction, such as sodium hydroxide, potassium hydroxide, barium hydroxide, trimethylamine and triethylamine, sodium hydroxide being preferred.

More specifically, a resole can be produced by reacting phenol with formaldehyde under basic conditions to form a methylol group containing resin as follows: By addition reaction:

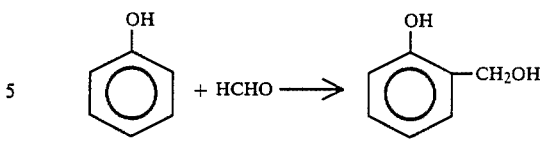

and other methylol derivatives. By condensation reaction:

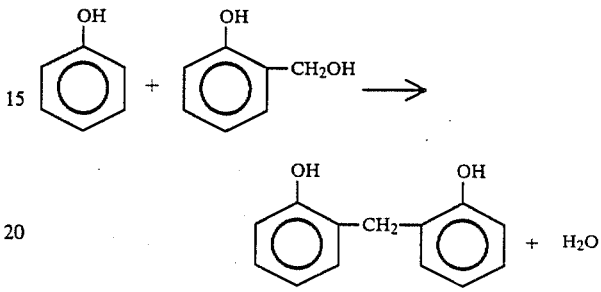

Resoles have a complex composition. Different reaction conditions such as reaction temperature, reaction time, pH value, aldehyde/phenol mole ratio and catalyst have such an effect that resoles may be obtained having different reactivity, viscosity and processing characteristics.

In particular, high solid content, low molecular weight phenolic resins, such as resole resins, are initially obtained according to the invention, that are highly reactive and especially suitable for processing to fabricate the instant hybrid foam. Desirably, the resole resin has a pH of about 4.5–9.5, a solid content of about 50–98%, preferably 80–95%, and a resin viscosity not greater than about 100,000 cps/25° C.

Any of the polyisocyanates ordinarily used in polyurethane (PU) foam production can be used as the polyfunctional isocyanate, such as diisocyanates or (higher than difunctional) polyisocyanates, and their prepolymers or quasi-prepolymers. These include aliphatic, and preferably aromatic, diisocyanates and polymeric isocyanates. Isocyanate prepolymers and quasi-prepolymers which are prepared from polyether, polyester, polycaprolactone or polybutadiene polyols can be blended into the formulation to attain a desired phenol-aldehyde/polyurethane (PA/PU) hybrid foam.

Suitable polyisocyanate compounds include: polyfunctional aromatic isocyanates such as
(1) 2,4-toluene diisocyanate (TDI)
(2) 2,6-toluene diisocyanate (TDI)
(3) 4,4'-diphenylmethane diisocyanate (MDI)
(4) 1,5-naphthalene diisocyanate (NDI)
(5) tolidine diisocyanate (3,3'-dimethyldiphenyl-4,4'-diisocyanate) (TODI)
(6) triphenylmethane triisocyanate
(7) p-phenylene diisocyanate (PPDI)
(8) xylene diisocyanate (4,6-xylylene diisocyanate) (XDI)

and polyfunctional aliphatic and/or cycloaliphatic isocyanates such as
(9) 1,6-hexamethylene diisocyanate (HDI)
(10) isophorone diisocyanate (3-isocyanatomethyl-3,5,5-trimethylcyclohexyl isocyanate) (IPDI)
(11) 2,6-bis(isocyanatomethyl) cyclohexane
(12) 4,4'-dicyclohexylmethane diisocyanate ($H_{12}$MDI)

(13) 2,2,4-trimethyl-1,6-hexamethylene diisocyanate (TMDI)
(14) 1,4-cyclohexyl diisocyanate (CHDI).

The polyfunctional isocyanate may be used in a commercial form such as polymethylene polyphenylisocyanate (PAPI), e.g. of 135 molecular weight, i.e. polymeric 4,4'-diphenylmethane diisocyanate (MDI).

Besides the required phenolic resin and polyisocyanate components, different types of aliphatic group containing polyols can be readily incorporated into the formulation, or into the polyisocyanate where provided in the form of prepolymers or quasi-prepolymers, to promote the sound absorption ability of the hybrid foam.

The term "polyol" is used broadly according to this invention to include any aliphatic group containing compound having two or more hydroxy groups. However, the preferred type polyol has a long chain containing terminal hydroxyl groups.

Suitable polyols include:
polyether polyols of the formula $$A\text{+}(OR)_n\text{—}OH]_m \quad (A)$$

wherein m is an integer from 2-6, n is an integer from 1-500, R is a divalent straight or branched chain, saturated or unsaturated aliphatic hydrocarbon group having 1-12 carbon atoms, typical of which are polymethylenes such as —CH$_2$CH$_2$— (dimethylene), —CH$_2$CH$_2$CH$_2$— (trimethylene), —(CH$_2$)$_4$— (tetramethylene), —CH(CH$_3$)CH$_2$— (1-methyl-dimethylene), and the like, and A is an alkylene or substituted alkylene group (i.e. alkane-diyl to alkane-hexyl per integer m) having 2-12 carbon atoms, such as propane-1,2-diyl, hexane-1,2,3,4,5,6-hexyl, and the like;

polyester polyols of the formula

wherein n is an integer from 1-500, R is a divalent straight or branched chain, saturated or unsaturated aliphatic hydrocarbon group having 1-12 carbon atoms, such as —CH$_2$— (methylene), —(CH$_2$)$_4$— (tetramethylene), —(CH$_2$)$_{12}$— (dodecamethylene), —CH=CH— (ethenylene), —CH$_2$—CH=CH— (propenylene), —CH=CH(CH$_2$)$_{10}$— (1-dodecenylene), and the like; and R' is a divalent straight or branched chain, saturated or unsaturated aliphatic hydrocarbon group having 1-12 carbon atoms such as —CH$_2$— (methylene), —(CH$_2$)$_4$— (tetramethylene), —(CH$_2$)$_{12}$— (dodecamethylene), —CH=CH— (ethenylene), —CH$_2$—CH=CH— (2-propenylene), —CH=CH(CH$_2$)$_{10}$— (1-dodecenylene), and the like, or an aromatic hydrocarbon group such as phenylene, biphenylene, naphthylene, and the like;

polycaprolactone polyols of the formula

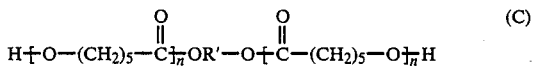

wherein n is an integer from 1-200, and R' is a divalent straight or branched chain, saturated or unsaturated aliphatic hydrocarbon group having 2-6 carbon atoms, such as —CH$_2$CH$_2$— (dimethylene), —(CH$_2$)$_4$— (tetramethylene), and the like; or polybutadiene polyols of the formula

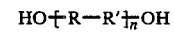

wherein n is an integer of from 1-200, R is —CH=CH—CH$_2$—CH$_2$— (1-butenylene), —CH$_2$—CH=CH—CH$_2$— (2-butenylene) or —CH$_2$—CH(CH=CH$_2$)— (2-ethenylethylene), and R' is —CH=CH—CH$_2$—CH$_2$— (1-butenylene), —CH$_2$—CH=CH—CH$_2$— (2-butenylene), —CH$_2$—CH(CH=CH$_2$)— (2-ethenylethylene) or —CH$_2$—CH(CN)— (cyano-ethylene).

Polyether polyols (A) are preferred, especially trifunctional aliphatic polyether polyols having a molecular weight of from about 500–1500, as they improve significantly the sound absorption ability of the instant product (see Table 2 below). However, polyester polyols (B), polycaprolactone polyols (C) and polybutadiene polyols (D) all perform in generally equivalent manner to polyether polyols (A) according to this invention.

Any desired kind of filler can be incorporated in conventional manner into the composition, such as organic, inorganic and metallic fillers. Organic fillers include cellulose and its derivatives, natural fiber and fabrics thereof, and the like. Inorganic fillers include carbon fiber, graphite fiber, boron fiber, silica fiber, glass fiber, ceramic fiber, mica, clay, perlite, and the like. Metallic fillers include any kind of metal powder, fiber and fabrics thereof.

Although the main composition of the hybrid foam of the invention consists of the phenolic resin, polyisocyanate and optional polyol, any kind of additives for plastics which are conventionally used in polymer processing can also be incorporated in conventional amounts into the composition, such as antioxidants, ultraviolet stabilizers, heat stabilizers, pigments, flame retardants, and the like.

Any conventional catalyst for polyurethane foam preparation can be used as catalyst for the hybrid foam preparation according to the invention to achieve a desirable effect, such as base or alkaline catalysts, including amines, and particularly tertiary amines, e.g. triethylamine, triethylenediamine, N-methylmorpholine, etc., and metal salt catalysts or organic metal catalysts, including metal carboxylates, e.g. dibutyltin dilaurate. These catalysts can be used alone or in combination, in a total amount of 0.01–2.0, and preferably 0.05–2, parts by weight based on the 100 parts by weight of phenolic resin. Tertiary amines such as DABCO, i.e. 1,4-diaza-[2.2.2]-bicyclo-octane or tetraethylenediamine, and/or metal salts such as DBTDL, i.e. dibutyltin dilaurate, when used in suitable proportion, are the preferred catalysts.

The blowing agents used are preferably of the chemical type such as H$_2$O (e.g. which may be present in the starting phenolic resin), which reacts with the isocyanate to form polyurea linkages and at the same time to generate CO$_2$ that causes expansion and flexible open cell foam production. Physical type blowing agents can also be applied such as Freon, i.e. CCl$_3$F, or CH$_2$Cl$_2$. The blowing agent may be present in an amount up to about 50 parts by weight based on the 100 parts by weight of phenolic resin.

Any suitable surfactant may be included in the formulation to facilitate foaming, such as a silicon type surfactant. The surfactant may be present in an amount of about 0.1-10, preferably 1-5, parts by weight based on the 100 parts by weight of phenolic resin.

The produced polymer composition in general constitutes a matrix formed of a network of phenol-aldehyde resin units, polyurethane units, and polyurea units. In particular, the polyurethane units include linkages formed from hydroxy groups of phenol-aldehyde units and isocyanate groups of aromatic or aliphatic polyisocyanate units, and from hydroxy groups of aliphatic group containing polyol units and isocyanate groups of aromatic or aliphatic polyisocyanate units, i.e. where such a polyol component is present in the mixture which is reacted and polymerized, and the polyurea units include linkages formed from water, e.g. originally present in the phenol-aldehyde resin, and isocyanate groups of aromatic or aliphatic polyisocyanate units.

The polymer end product of the invention constitutes a complex hybrid matrix system which results from a rather complex polymerization reaction. This reaction typically proceeds at normal temperature and pressure, e.g. in an open mold.

In the primary reaction, usually the polyisocyanate as a separate first component is combined at room temperature with a separate second component, in the form of a premixture of the phenol-aldehyde (PA) resin, catalyst and blowing agent, e.g. optionally also containing a surfactant, and the combined mixture of the two components is poured into an open mold to carry out the foaming reaction, whereby to produce a PA/PU hybrid foam containing as reaction products:

(1) a PA network polymer of condensed PA resin unit linkages, (2) a phenolic based polyurethane (PU) polymer of interreacted PA resin unit and polyisocyanate unit linkages, e.g. poly(—CONH—R—NHCOO—R'—O—) where R is derived from the polyisocyanate and R' is derived from the phenol-aldehyde resin, and (3) a polyisocyanate based polyurea polymer of interreacted polyisocyanate unit linkages in the presence of water originating from the PA resin, e.g. poly(—R—NHCONH—R—), with the concomitant generation of $CO_2$ serving as chemical blowing agent.

In the polyol modified reaction, the same procedure is followed, except that the polyol is usually mixed with the PA resin before the other ingredients are added to form the second component, which is then admixed with the polyisocyanate as first component. In this modified case, the produced PA/PU hybrid polymer foam contains, in addition to said (1), (2) and (3) reaction products, a reaction product (4), constituting a typical PU polymer of interreacted polyol unit and polyisocyanate unit linkages, analogous to polymer (2) above, but wherein R' is derived from the polyol.

Where a filler is included, it is normally admixed with the PA resin before the latter is mixed with any polyol and thereafter with the other ingredients to form the premixture serving as second component.

The corresponding weight ratio of the first component (50-300 parts polyisocyanate) to the second component (premixture of 100 parts PA resin, 0-100 parts polyol, 0-100 parts filler and 0-50 parts blowing agent, totalling 100-350 parts, i.e. exclusive of the 0.01-2 parts catalyst and 0.1-10 parts surfactant) is about 0.14-3:1. The corresponding weight ratio of the phenol-aldehyde resin to polyol is from infinite (where no polyol is present) to 1.0:1, i.e. 100:0-100 or 1:0-1.

Preferably, the instant hybrid foams have an apparent bulk density not greater than about 5.0 lbs/ft³, a flammability burning time not greater than about 15 seconds, a flame propagation height not greater than about 15 cm, and more than about 75% weight retention after burning (flammability test).

The apparent bulk density of the hybrid foams was determined according to ASTM D-1622 (Amer. Soc. for Testing and Materials), and their flammability according to ASTM D-3014 test, wherein T in seconds is the burning time, H in cm is the flame propagation height, and PWR in % is the specimen weight retention after flammability test. The superior flame retardancy properties found for the instant hybrid foams is considered to result from the high degree of aromaticity of the phenol-aldehyde/polyisocyanate hybrid polymer.

It will be understood that said ASTM D-3014 flammability test is used as a screening procedure for comparing relative extent and time of burning and loss of weight of rigid cellular plastics, constituting a standard used to measure and describe the properties of materials, products, or assemblies in response to heat and flame under controlled laboratory conditions.

FIGS. 1 to 6 are graphs showing sound absorption coefficient values over the 800-5000 Hz sound frequency range of hybrid foam products of the invention and a commercial polyurethane foam product used as a sound absorption material, as covered in Examples 1-5.

The sound absorption ability of the instant hybrid foams was measured in accordance with the sound absorption coefficient which is defined per the following equation:

$$\text{alpha} = \frac{Ii - Ir}{Ii}$$

wherein alpha is the sound absorption coefficient, Ii is the incident sound intensity (watt/m²), and Ir is the reflected sound intensity (watt/m²).

The sound absorption coefficient was measured according to ASTM C-384, using a Bruel & Kjaer standing wave apparatus (type 4002), set at a sound frequency range from 800 Hz to 5000 Hz.

As compared to an average sound absorption coefficient of 0.208 as measured for the commercial polyurethane foam (see Table 2 below), average sound absorption coefficients of from 0.155-0.511 have been measured for various hybrid foams of this invention. (The average sound absorption coefficient is defined as the mean value of the sound absorption coefficient at 250, 500, 1000 and 2000, Hz frequencies, respectively.)

In general, the hybrid foams of the invention desirably have an average sound absorption coefficient of at least about 0.1 and preferably up to above about 0.98, such as about 0.1-0.99, preferably at least about 0.5, such as about 0.5-0.99. In particular, the hybrid foams of the invention may have a sound absorption coefficient ranging generally from at least about 0.5 at 800 Hz to up to about 0.7-0.99 at higher frequencies, e.g. of 1600-2000 Hz, and/or of up to 5000 Hz.

The hybrid foams of this invention possess superior sound absorption properties as compared to analogous known foam formulations (see Table 2 below and FIGS. 1-6; see, also, Alex C. F. Chen, et al., J. Appl. Polym. Sci., vol. 20, pp. 3387-3423 (1976), supra, especially Table 1 thereof, p. 3397).

The following examples are merely illustrative of preferred embodiments of the invention. Many variations thereon may be made without departing from the spirit of the disclosed invention, as will be evident to those skilled in the art, and such variations are intended to come within the scope of what is claimed.

EXAMPLE A

Resole resin synthesis and hybrid foam manufacture

Resole Resin Synthesis:

To provide a formaldehyde/phenol mole ratio equal to 1.2, 2353 g (25 moles) of molten phenol and 2432 g of 37% (900 g; 30 moles) aqueous formalin were charged into a 5-liter three-necked reactor fitted with a stirrer, condenser and thermometer. The formalin and phenol were mixed thoroughly for about 10 minutes, and then 130 ml of sodium hydroxide (NaOH) solution (20% wt/wt) were added slowly. The pH value of the reaction mixture was adjusted to 7.5–10.5, and the temperature was then raised to 70°–95° C. When the reaction temperature rises to 80° C. it is necessary to apply a vacuum to the reaction system to remove excess heat so as to keep the reaction mixture being refluxed within the 70°–95° C. range.

At this stage, the resin changed from clear to a straw color. The resin was heated under reflux for several hours, and then cooled to 50° C. By adding approximately 140 ml of 10% wt/wt aqueous $H_2SO_4$ at this temperature, the pH value of the reaction mass was adjusted to about 7.0–7.5. While keeping the temperature below 50° C., 1700 cc of water were removed from the reaction mass under vacuum, and a straw colored resole was obtained which had a free formaldehyde content of 2.0–5.0%, a water content below 5%, a viscosity of about 3,000–20,000 cps/25° C., and a solid content of about 85–90%.

This high solid content, low molecular weight resin is usable as a highly reactive phenolic resin component, i.e. PA resin, for processing with the polyisocyanate component to form the hybrid foams of this invention.

The solid content of the resin was determined by placing a fixed quantity thereof into an oven at 140° C. for 4 hours, and then checking the resin weight loss. The water content of the resin was determined by using the Karl-Fischer method, and its viscosity was measured by using a Brook field viscometer.

The free formaldehyde content was accurately determined by reacting hydroxylamine hydrochloride with the free formaldehyde present in the resole. During such reaction, HCl is released according to the following equation:

$$HCHO + NH_2OH \cdot HCl \rightarrow CH_2NOH + H_2O + HCl$$

The HCl was then titrated with a standard alkaline solution.

In the above run, the mole ratio was 1.2 moles HCHO per mole phenol. In the same way, a series of phenol-formaldehyde (PF) resoles were prepared with formaldehyde/phenol (F/P) mole ratios of 1.5, 1.7, 2.0, 2.5 and 3.0, respectively. It has been found that as the aldehyde/phenol mole ratio is decreased, the free HCHO of the resole also decreases, and a light colored resin with low viscosity and high solid content is obtained. The pertinent specifications of the resoles synthesized in these runs are listed in the following Table 1:

TABLE 1

Resoles of Different Formaldehyde/Phenol Mole Ratio

| Run No. | F/P Mole Ratio | Solid Content % | $H_2O$ % | HCHO % | Viscosity at 25° C. |
|---|---|---|---|---|---|
| 1 | 1.2 | 92 | 3.0 | 1.9 | 4,000 |
| 2 | 1.5 | 90 | 2.5 | 1.7 | viscous liquid |
| 3 | 1.5 | 89 | 4.7 | 1.9 | 15,000 |
| 4 | 1.5 | 89.7 | 3.5 | 2.2 | 8,000 |
| 5 | 1.7 | 87.6 | 3.5 | 2.5 | 15,000 |
| 6 | 1.7 | 87.2 | 3.9 | 2.9 | 12,000 |
| 7 | 2.0 | 85 | 4.9 | 4.4 | 6,000 |
| 8 | 2.0 | 85 | 5.5 | 2.9 | 8,000 |
| 9 | 2.0 | 86 | 4.9 | 2.6 | 12,000 |
| 10 | 2.5 | 84 | 5.4 | 4.6 | 10,000 |
| 11 | 3.0 | 83 | 5.8 | 4.8 | 11,000 |

Hybrid Foam Manufacture:

The phenol-aldehyde/polyurethane (PA/PU) hybrid foams were prepared by the one-shot, free foaming method in an open mold.

According to the one-shot method, the polyisocyanate was provided in the desired amount as a separate component (I), while the particular phenolic resins (resoles), polyols, catalysts, surfactants, blowing agents, fillers and any other additives to be included in the formulation were combined in the appropriate amounts and mixed thoroughly to form a component (II). Then, the component (I) polyisocyanate was combined with the component (II) premixture by mixing the components thoroughly, and the resulting reaction mixture was poured into an open mold, wherein the foaming reaction was allowed to proceed to produce the desired hybrid foam, at normal temperature and pressure (about 20° C. and 1 atm.).

The hybrid foam product was post-cured in an oven at 120° C. for 2 hours. The resultant hybrid foam was then cut into specified dimensions and thicknesses for further testing as covered in the following Examples 1–5, Table 2 and FIGS. 1–6.

EXAMPLE 1

The phenol-formaldehyde/polyurethane (PF/PU) hybrid foam of this example was prepared per the procedure of Example A, and subjected to various tests, along with a comparative specimen of a typical commercially available polyurethane (PU) foam used for sound absorption.

The constituent formulation of the hybrid foam of this example, and its properties compared to those of said commercial PU foam, including density, thickness, and results of flame retardancy performance per flammability test, are listed in Table 2, while sound absorption coefficient data of this hybrid foam and said commercial PU foam are plotted in FIG. 1.

As shown in Table 2, percent weight retention (PWR) of the hybrid foam of this example is 96%, which is about seven times better than that of the compared commercial PU foam. Burning time (T) of this hybrid foam is only 6 seconds, and flame propagation height (H) is only 6 cm, compared to an extended burning time of 50 seconds and a flame propagation height of more than 25 cm for the commercial PU foam. This hybrid foam clearly possesses a superior flame retardancy property over the commercial PU foam.

In FIG. 1, the hybrid foam of this example, compared to the commercial PU foam, shows a significant sound absorption ability. The test results demonstrate the significant effect on sound absorption possessed by the instant hybrid foam.

EXAMPLE 2

The PF/PU hybrid foam of this example was prepared per the procedure of Example A, and subjected to various tests, along with the comparative specimen of said commercial polyurethane (PU) foam, in the same manner as in Example 1. The formulation of the hybrid foam of this example, and its properties compared to those of said commercial PU foam, are also listed in Table 2, while sound absorption coefficient data of this hybrid foam and said commercial PU foam are plotted in FIG. 2.

As shown in Table 2, in this example 10 parts by weight of trifunctional aliphatic polyether polyol (molecular weight 500) were included in the component (II) premixture. Specifically, the polyol was added directly to the phenolic resin and then the other ingredients used to form the premixture were thoroughly admixed therewith. While the results obtained with the hybrid foam of this example are generally of the same superior nature as those of the hybrid foam of Example 1, it was found that inclusion of the soft segment polyether polyol in the formulation causes a slight decrease in the flame retardancy property of the hybrid foam.

Nevertheless, when such soft segment polyether polyol component is included in the instant foaming formulation, the resultant polyol modified PF/PU hybrid foam increases in rheological viscous behavior, and establishes that the instant hybrid foam can convert sound energy into heat energy form and be dissipated, such that the overall effect is to promote the sound absorption ability of the polyol modified PF/PU hybrid foam to a significant level, compared to the commercial PU foam. This phenomenon can be appreciated clearly in FIG. 2.

EXAMPLE 3

The PF/PU hybrid foam of this example was prepared per the procedure of Example A, and subjected to various tests, along with the comparative specimen of said commercial polyurethane (PU) foam, in the same manner as in Example 1. The formulation of the hybrid foam of this example, and its properties compared to those of said commercial PU foam, are also listed in Table 2, while sound absorption coefficient data of this hybrid foam and said commercial PU foam are plotted in FIG. 3.

Although the main ingredients of the hybrid foam composition are the phenolic resin and polyisocyanate (PAPI), as shown in Table 2 in this example 10 parts by weight of trifunctional aliphatic polyether polyol (molecular weight 700) were included in the component (II) premixture per the mixing procedure of Example 2.

The results obtained with the hybrid foam of this example are also generally of the same superior nature as those of the Example 1 hybrid foam, and in this case it was found that inclusion of this polyether polyol in the formulation leads to a hybrid foam exhibiting excellent flame retardancy performance, i.e. the incorporation of this polyol into the formulation does not adversely affect the flame retardancy performance as compared to the PF/PU hybrid foam of Example 1, for convenience referred to as pure PF/PU hybrid foam.

Figure 3:
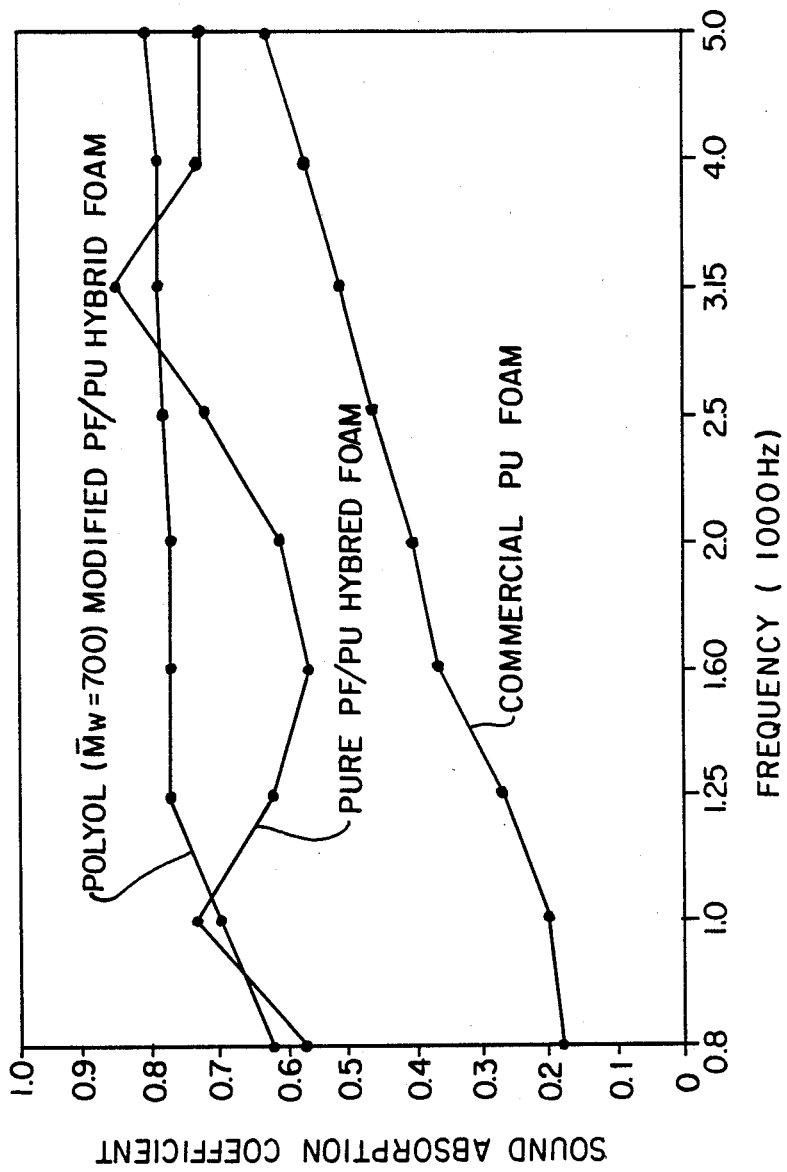

From the comparison in FIG. 3 of the sound absorption coefficient data of this polyol (700 mol. wt.) modified PF/PU hybrid foam with the commercial PU foam and the pure PF/PU hybrid foam of Example 1, it is clear that the polyol modified hybrid foam of this example exhibits an excellent sound absorption ability.

EXAMPLE 4

The PF/PU hybrid foam of this example was prepared per the procedure of Example A, and subjected to various tests, along with the comparative specimen of said commercial polyurethane (PU) foam, in the same manner as in Example 1. The formulation of the hybrid foam of this example, and its properties compared to those of said commercial PU foam, are also listed in Table 2, while sound absorption coefficient data of this hybrid foam and said commercial PU foam are plotted in FIG. 4, and such data of this hybrid foam and those of Examples 1 and 3 are plotted in FIG. 5.

In this example, 10 parts by weight of trifunctional aliphatic polyol (molecular weight 1500) were included in the formulation per the mixing procedure of Example 2. As shown in Table 2, the polyol modified hybrid foam exhibits a good flame retardant performance.

Figure 4:
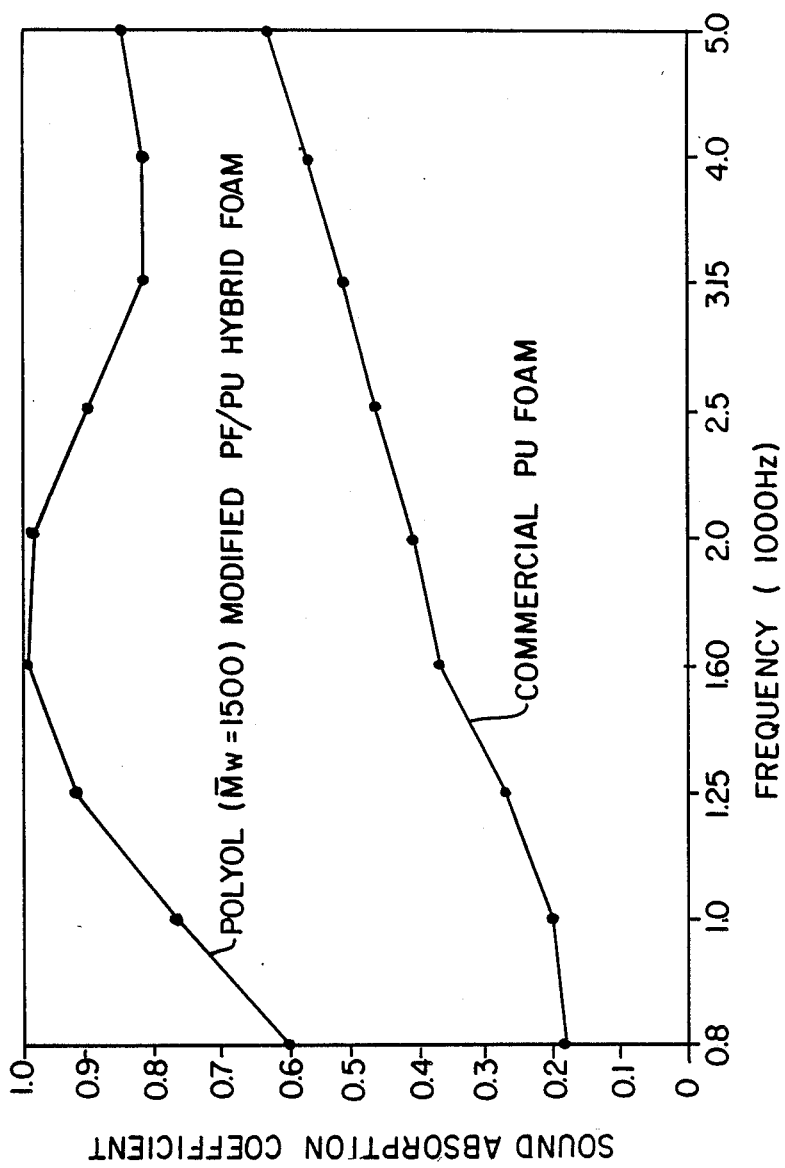

From the comparison in FIG. 4 of the sound absorption coefficient data of this polyol (1500 mol. wt.) modified PF/PU hybrid foam with the commercial PU foam, it is clear that the hybrid foam of this example exhibits an outstanding effect, especially in the frequency region between 1500 and 2000 Hz, indicating nearly 98% sound absorption ability.

Figure 5:
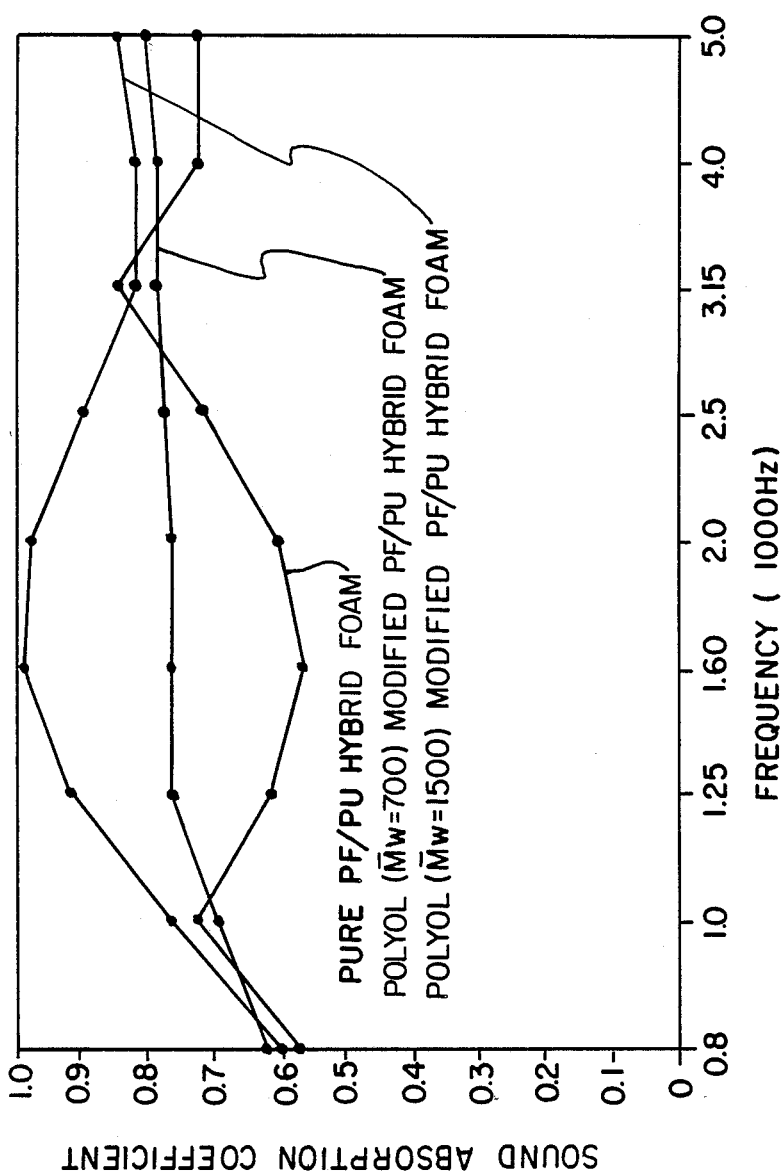

From the comparison in FIG. 5 of the sound absorption coefficient data of the hybrid foam of this example, with the pure PF/PU hybrid foam of Example 1 and the polyol (700 mol. wt.) modified PF/PU hybrid foam of Example 3, it is seen that at the same weight fraction addition (i.e. 10 pts by wt polyol/100 pts by wt phenolic resin) as in Example 3, a higher molecular weight polyol can enhance sound absorption properties much more effectively than a lower molecular weight polyol.

EXAMPLE 5

The PF/PU hybrid foam of this example was prepared per the procedure of Example A, and subjected to various tests, along with the comparative specimen of said commercial polyurethane (PU) foam, in the same manner as in Example 1. The formulation of the hybrid foam of this example, and its properties compared to those of said commercial PU foam, are also listed in Table 2, while sound absorption coefficient data of this hybrid foam, and those of the hybrid foam of Example 3 and of said commercial PU foam, are plotted in FIG. 6.

In this example, 10 parts by weight of trifunctional aliphatic polyol (molecular weight 700) were included in the formulation, plus 10 parts by weight of glass fiber as filler. In this case, the glass fiber was added directly to the phenolic resin and then the other ingredients, including the polyol, used to form the premixture were thoroughly admixed therewith. As shown in Table 2, the polyol modified and glass fiber filled hybrid foam exhibits a good flame retardancy performance.

Figure 6:
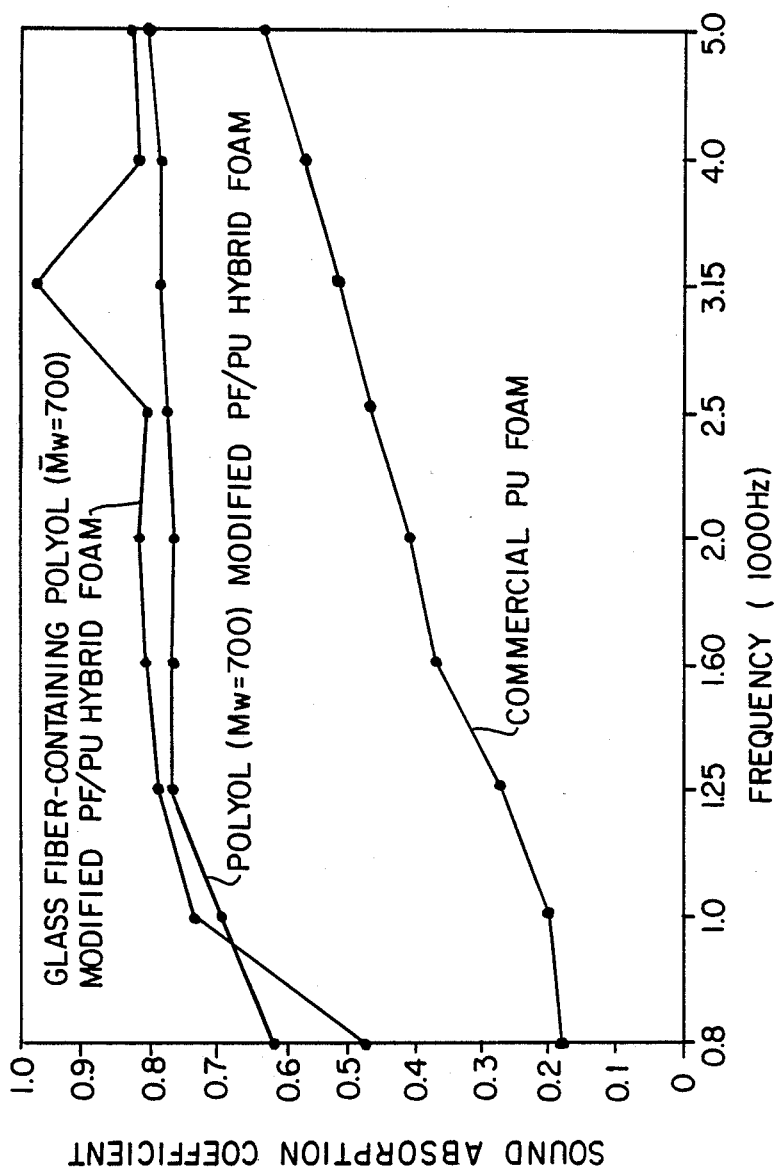

From the comparison in FIG. 6 of the sound absorption coefficient data of this polyol (700 mol. wt.) modified and glass fiber filled PF/PU hybrid foam, with the polyol (700 mol. wt.) modified hybrid foam of Example 3, which does not contain any filler, and with the commercial PU foam, it is clear that when glass fiber is added to the composition, the sound absorption ability of the hybrid foam per this example is enhanced to a significant level, compared to the corresponding hybrid foam which does not contain any glass fiber filler.

The various results discussed above are set forth in Table 2, wherein all parts by weight of the indicated ingredients are based on 100 parts of the phenolic resin (resole resin).

TABLE 2
Composition and Properties (Performance)

| Composition (parts by wt.) | Commercial PU Foam | Ex. 1 | Ex. 2 | Ex. 3 | Ex. 4 | Ex. 5 |
|---|---|---|---|---|---|---|
| Component (I) | | | | | | |
| a. PAPI | — | 120 | 130 | 130 | 120 | 130 |
| Component (II) | | | | | | |
| b. Phenolic resin | — | 100 | 100 | 100 | 100 | 100 |
| c. DC-190 | — | 2 | 2 | 2 | 2 | 2 |
| d. Freon | — | 20 | 20 | 15 | 13 | 17 |
| e. DABCO | — | 0.05 | 0.05 | 0.05 | 0.05 | 0.15 |
| f. DBTDL | — | 0.1 | 0.1 | 0.15 | 0.15 | 0.15 |
| g. Triol-500 | — | — | 10 | — | — | — |
| h. Triol-700 | — | — | — | 10 | — | 10 |
| i. Triol-1500 | — | — | — | — | 10 | — |
| j. Glass fiber | — | — | — | — | — | 10 |
| Properties: | | | | | | |
| Bulk density (lbs/ft³) | 3.0 | 1.55 | 1.65 | 2.1 | 2.1 | 1.94 |
| Thickness (cm) | 2.0 | 2.0 | 2.0 | 2.1 | 2.0 | 2.0 |
| Flammability | | | | | | |
| T (sec) | 50 | 6 | 7 | 7 | 8 | 6 |
| H (cm) | >25 | 6 | 7 | 8 | 8 | 6 |
| PWR (%) | 12 | 96 | 94 | 93.4 | 93 | 95 |
| Sound absorption coefficient (alpha) | See FIGS. 1-4 & 6 | See FIG. 1 | See FIG. 2 | See FIG. 3 | See FIGS. 4-5 | See FIG. 6 |

What is claimed is:

1. A lightweight, flame retardant, sound absorption composition, comprising a phenol-aldehyde/polyurethane hybrid polymer foam of open cell structure and interconnected continuous porous architecture, formed from 100 parts by weight phenolic resin, about 50-300 parts by weight polyisocyanate, about 5-30 parts by weight aliphatic group containing polyol having a molecular weight of from 500 to 1500, and about 0-100 parts by weight filler.

2. Composition of claim 1 wherein the phenolic resin is a resole resin of an aldehyde compound and a phenol compound having an aldehyde to phenol mole ratio greater than about 1:1.

3. Composition of claim 2 wherein said ratio is about 1.2-3:1.

4. Composition of claim 3 wherein the aldehyde compound is formaldehyde and the phenol compound is phenol.

5. Composition of claim 1 wherein the polyisocyanate is an aromatic or aliphatic polyisocyanate.

6. Composition of claim 1 including an aliphatic group containing polyether polyol, polyester polyol, polycaprolactone polyol or polybutadiene polyol.

7. Composition of claim 1 including a polyether polyol of the formula $$A+(OR)_n-OH]_m \quad (A)$$

wherein m is an integer from 2-6, n is an integer from 1-500, R is a divalent straight or branched chain, saturated or unsaturated aliphatic hydrocarbon group having 1-12 carbon atoms, and A is an alkylene or substituted alkylene group having 2-12 carbon atoms; a polyester polyol of the formula $$H+OROOCR'CO]_n OROH \quad (B)$$

wherein n is an integer from 1-500, R is a divalent straight or branched chain, saturated or unsaturated aliphatic hydrocarbon group having 1-12 carbon atoms, and R' is a divalent straight or branched chain, saturated or unsaturated aliphatic hydrocarbon group having 1-12 carbon atoms or an aromatic hydrocarbon group; a polycaprolactone polyol of the formula

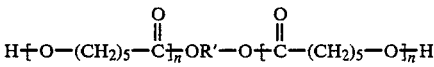

$$H+O-(CH_2)_5-\overset{O}{\underset{\|}{C}}]_n OR'-O+\overset{O}{\underset{\|}{C}}-(CH_2)_5-O]_n H \quad (C)$$

wherein n is an integer from 1-200, and R' is a divalent straight or branched chain, saturated or unsaturated aliphatic hydrocarbon group having 2-6 carbon atoms; or a polybutadiene polyol of the formula $$HO+R-R']_n OH \quad (D)$$

wherein n is an integer of from 1-200, R is —CH=CH—CH₂—CH₂—, —CH₂—CH=CH—CH₂— or —CH₂—CH(CH=CH₂)—, and R' is —CH=CH—CH₂—CH₂—, —CH₂—CH=CH—CH₂—, —CH₂—CH(CH=CH₂)— or —CH₂—CH(CN)—.

8. Composition of claim 1 including an organic, inorganic or metallic filler.

9. Composition of claim 1 having a bulk density not greater than about 5.0 lbs/ft³.

10. Composition of claim 1 having a flammability burning time not greater than about 15 seconds, a flame propagation height not greater than about 15 cm, and more than about 75% weight retention after such burning.

11. Lightweight, flame retardant and flame propagation suppressing, sound absorption composition, comprising a phenol-formaldehyde/polyurethane hybrid polymer foam of open cell structure and interconnected continuous porous architecture, formed from 100 parts by weight of a resole resin of formaldehyde and a phenol compound having a formaldehyde to phenol mole ratio of about 1.2-3:1, about 50-300 parts by weight of aromatic or aliphatic polyisocyanate, about 5-30 parts by weight of aliphatic group containing polyether polyol, polyester polyol, polycaprolactone polyol or polybutadiene polyol having a molecular weight of from 500 to 1500, and about 0-100 parts by weight filler, the foam having a bulk density not greater than about 5.0 lbs/ft³, and a flammability burning time not greater than about 15 seconds, a flame propagation height not greater than about 15 cm, and more than about 75% weight retention after such burning.

12. Process for producing a lightweight, flame retardant, sound absorption composition in the form of a phenolaldehyde/polyurethane hybrid polymer foam of open cell structure and interconnected continuous porous architecture, which comprises reacting 100 parts by weight phenolic resin, about 50-300 parts by weight polyisocyanate, about 5-30 parts by weight aliphatic group containing polyol having a molecular weight of from 500 to 1500, and about 0-100 parts by weight filler, in the presence of a catalyst and a blowing agent, and postcuring the reaction product for a period of about two hours at about 120° C.

13. Process of claim 12 wherein all of the reactants but said polyisocyanate are premixed and then combined with the polyisocyanate for reaction in an open mold, the catalyst being a basic catalyst and/or metal salt catalyst, and being present in an amount of about 0.01–2 parts by weight.

14. Process of claim 13 wherein about 0.1–10 parts by weight surfactant are included in the premixed reactants.

15. Process of claim 13 wherein up to about 50 parts by weight blowing agent are included in the premixed reactants.

16. Process of claim 12 wherein the phenolic resin is a resole resin of an aldehyde compound and a phenol compound having an aldehyde to phenol mole ratio greater than about 1:1.

17. Process of claim 16 wherein said ratio is about 1.2–3:1, and the resole resin has a pH of about 4.5–9.5, a solid content of about 50–98%, and a viscosity not greater than about 100,000 cps at 25° C.

18. Process of claim 17 wherein the aldehyde compound is formaldehyde and the phenol compound is phenol.

19. Process of claim 12 wherein the polyisocyanate is an aromatic or aliphatic polyisocyanate.

20. Process of claim 12 wherein an aliphatic group containing polyether polyol, polyester polyol, polycaprolactone polyol or polybutadiene polyol is included in the reaction mixture.

21. A lightweight, flame retardant, sound absorption composition comprising a phenol-aldehyde/polyurethane hybrid polymer foam formed from 100 parts by weight of phenolic resin, from about 50 to 300 parts by weight of polyisocyanate, about 5 to 30 parts by weight of a trifunctional aliphatic polyether polyol having a molecular weight of from 500 to 1500 and at least 10 parts by weight of a filler.

22. The composition of claim 1 wherein the filler is a glass fiber.

* * * * *